United States Patent
Maruoka et al.

(10) Patent No.: US 7,040,368 B2
(45) Date of Patent: May 9, 2006

(54) HEAVY DUTY TIRE

(75) Inventors: Kiyohito Maruoka, Kobe (JP); Akio Miyori, Kobe (JP)

(73) Assignee: Sumitomo Rubber Industries, Ltd., Hyogo-kin (JP)

( * ) Notice: Subject to any disclaimer, the term of this patent is extended or adjusted under 35 U.S.C. 154(b) by 10 days.

(21) Appl. No.: 10/984,884

(22) Filed: Nov. 10, 2004

(65) Prior Publication Data

US 2005/0126675 A1    Jun. 16, 2005

(30) Foreign Application Priority Data

Dec. 10, 2003    (JP) ............................. 2003-412199

(51) Int. Cl.
*B60C 15/00*    (2006.01)

(52) U.S. Cl. ...................... 152/543; 152/539; 152/546; 152/552

(58) Field of Classification Search ................ 152/539, 152/543, 546, 552
See application file for complete search history.

(56) References Cited

U.S. PATENT DOCUMENTS

2005/0045260 A1*  3/2005  Maruoka et al. ......... 152/552 X

FOREIGN PATENT DOCUMENTS

| JP | 11-321244 A | 11/1999 |
|---|---|---|
| JP | 2002-67628 A | 3/2002 |

* cited by examiner

*Primary Examiner*—Adrienne C. Johnstone
(74) *Attorney, Agent, or Firm*—Birch, Steward, Kolasch & Birch, LLP

(57) ABSTRACT

A heavy duty tire comprises a carcass ply turned up around a bead core in each bead portion to form a pair of turnup portions and a main portion, and a bead reinforcing layer disposed in the bead portion and comprising an axially outer part and an axially inner part, wherein under a 50 kPa state of the tire in which the tire is mounted on a standard rim and inflated to 50 kpa: the turnup portion inclines towards the carcass ply main portion at an angle of less than 90 degrees; the distance La of the end of the turnup portion from the radially outer side of the bead core is in a range of from 5 to 12 mm; the radial height Ho of the axially outer part is in a range of from 20 to 35 mm; the distance To of the end of the axially outer part from the axially outer surface of the bead portion is in a range of from 6 to 12 mm; and the ratio To/Ho of the distance To to the height Ho is in a range of from 0.25 to 0.5.

9 Claims, 5 Drawing Sheets

$0.072 - 0.004 \times H_o - 0.004 \times H_i + 6.82 \times 10^{-5} \times H_o^2$
$- 6.016 \times 10^{-5} \times H_i \times H_o + 9.562 \times 10^{-5} \times H_i^2 = 0$ ----(1)

$0.102 - 0.004 \times H_o - 0.004 \times H_i + 6.82 \times 10^{-5} \times H_o^2$
$- 6.016 \times 10^{-5} \times H_i \times H_o + 9.562 \times 10^{-5} \times H_i^2 = 0$ ----(2)

$0.118 - 0.004 \times H_o - 0.004 \times H_i + 6.82 \times 10^{-5} \times H_o^2$
$- 6.016 \times 10^{-5} \times H_i \times H_o + 9.562 \times 10^{-5} \times H_i^2 = 0$ ----(3)

HEAVY DUTY TIRE

The present invention relates to a pneumatic tire, more particularly to a bead structure for a heavy duty tire improved in the bead durability.

Recent years, a so called bead wind structure as shown in FIG. 7 has been proposed, wherein a turnup portion (a) of a carcass ply is wound once around a bead core (b) so that the edge (a1) is placed on the radially outer side (bs) of the bead core (b). Such a structure is disclosed in the laid-open Japanese patent application JP-A-11-321244. In this structure, however, as the edge portion (a1) is short and its bent angle is large, the springback is large. This is especially true in case of steel cords. Therefore, a cavity is liable to be formed between the edge portion and the bead core during building the tire and the cord ends of the sprung-back turned up portion contact with the cords of the carcass main portion as shown in imaginary line and a fretting wear is also liable to occur.

In the laid-open Japanese patent application JP-A-2002-67628, there has been proposed a bead wind structure shown in FIG. 8, wherein a soft rubber (g) having a substantially constant thickness of 0.5 to 8.0 mm and a 50% modulus of 1.0 to 8.5 Mpa is disposed between the edge portion (a1) and the bead core (b). In this case, however, it was found that, at the axially innermost point Q1 of the bead core (b), micro-separation between the carcass cord filaments and rubber is liable to occur, and there is a possibility that such micro-separation develops into a ply separation failure under extraordinary service conditions such as very-high temperature and heavy load condition.

It is therefore, an object of the present invention to provide a heavy duty tire, in which the bead portion is effectively improved in durability under severe service conditions especially very-high temperature conditions as well as normal service conditions, while adopting the so called bead wind structure.

According to one aspect of the present invention, a heavy duty tire comprises
   a tread portion,
   a pair of sidewall portions,
   a pair of bead portions each with a bead core therein,
   a carcass ply extending between the bead portions through the tread portion and sidewall portions, and turned up around the bead core in each the bead portion from the axially inside to the axially outside of the tire to form a pair of turnup portions and a main portion between the bead cores, and
   a bead reinforcing layer disposed in each of the bead portions, wherein
   the turnup portion comprises
a base part which curves along an axially inner side, a radially inner side and an axially outer side of the bead core, and a deviating part extending axially inwards away from the bead core,
   the bead reinforcing layer comprises
a curved part extending along the radially inside of the base part of the turnup portion,
   an axially outer part extending radially outwardly away from the base part, while slightly inclining axially outwards, and an axially inner part extending along the axially inside of the carcass ply main portion,
   under a 50 kPa state of the tire in which the tire is mounted on a standard rim and inflated to 50 kPa:
   the deviating part inclines towards the carcass ply main portion at an angle theta of less than 90 degrees with respect to the radially outer side of the bead core;

the distance La of the end of the deviating part from the radially outer side of the bead core is in a range of from 5 to 12 mm;
   the radial height Ho of the axially outer part from the bead base line is in a range of from 20 to 35 mm;
   the distance To of the end of the axially outer part from the axially outer surface of the bead portion is in a range of from 6 to 12 mm; and
   the ratio To/Ho of the distance To to the height Ho is in a range of from 0.25 to 0.5.

Here, the standard rim is a design rim or a wheel rim officially approved for the tire by standard organization, i.e. JATMA (Japan and Asia), T&RA (North America), ETRTO (Europe), STRO (Scandinavia) and the like. The undermentioned bead base line is an axial line drawn passing a position corresponding to the wheel rim diameter.

Therefore, the micro-separation at the axially innermost point of the bead core is controlled, and the bead durability under very-high temperature conditions in particular can be effectively improved.

Embodiments of the present invention will now be described in detail in conjunction with the accompanying drawings.

FIG. 1 is a cross sectional view of a pneumatic tire according to the present invention.

FIGS. 2(a) and 2(b) are an enlarged cross sectional views of the bead portion.

Figure 1:
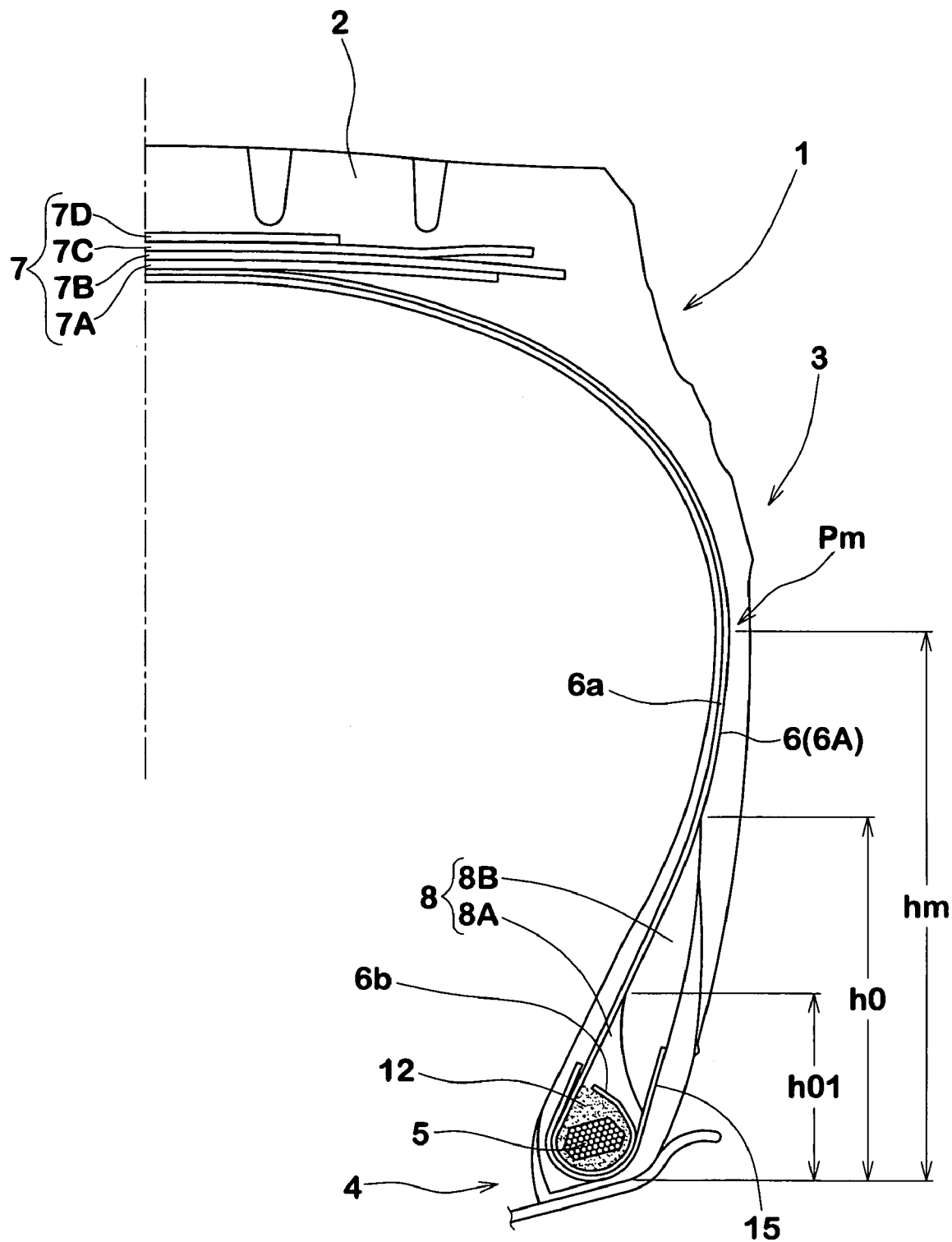

In the drawings, heavy duty tire 1 according to the present invention is a truck/bus radial tire comprising a tread portion 2, a pair of sidewall portions 3, a pair of bead portions 4 each with a bead core 5 therein, a carcass 6 extending between the bead portions 4, and a belt 7 disposed radially outside the carcass 6 in the tread portion 2.

In the following embodiments, the tire size is for example 11R22.5 (rim size 7.50×22.5). In this size, a normal tire inflation pressure is about 700 kPa.

In the drawings and the following description, a state in which the tire is mounted on a standard rim or its design rim and inflated to 50 kPa is referred unless otherwise-noted.

The bead core 5 is a ring formed by winding a steel wire predetermined times into a specific cross sectional shape. In this example, the cross sectional shape is a hexagonal shape which is generally long in the tire axial direction, and whose radially inner side SL is almost parallel to the bottom of the bead portion 4 so that the radially inner side SL becomes substantially parallel to the bead seat 31 of the standard rim 3 when mounted thereon.

In this embodiment, the radially inner side SL and a radially outer side Su of the bead core 5 are inclined at substantially 15 degrees with respect to the tire axial direction, because the standard rim 3 is a 15-degree center drop rim, and the bead seat 31 is tapered at 15 degrees toward the axially inside. Aside from such flattened hexagonal shape, however, various shapes, e.g. a regular hexagonal shape, oval and the like may be used too. In such a case, therefore, although the radially outer side Su or its extension is hereunder used as a reference line in determining the various dimensions and angles, a straight line K which is parallel to the bead bottom (more properly the bead seat J1) and tangent to the radially outside of the bead core 5 may be used instead.

The belt 7 comprises at least two plies, usually three or more plies including at least two cross plies, each made of cords laid parallel with each other so that the cords in one ply cross the cords in the other ply.

In this example, the belt 7 is compose of four plies: a radially innermost first breaker ply 7A made of steel cords laid at an angle of 45 to 75 degrees with respect to the tire equator; and second, third and fourth breaker plies 7B, 7C and 7D also made of steel cords laid at an angle of 10 to 35 degrees with respect to the tire equator.

The carcass 6 comprises a single ply 6A of cords arranged radially at an angle of from 70 to 90 degrees with respect to the tire equator. For the carcass cords, steel cords are used in this example. However, organic fiber cords, e.g. aromatic polyamide, polyester, rayon, nylon and the like may be used. Especially, high-modulus cords are preferred.

The carcass ply 6A consists of a main portion 6a extending from one of the bead cores 5 to the other, and a pair of turnup portions 6b each turned up around the bead core 5 in each bead portion from the axially inside to the axially outside.

The carcass ply turnup portion 6b is turned along about a lower half of the bead core 5, and then away from the bead core 5, it extends towards the carcass main portion 6a to terminate before the carcass main portion 6a, and the edge is secured between the under mentioned bead apex 8 and rubber filler 12.

In other words, the turnup portion 6b is composed of a base part 10 which is curved along an axially inner side Si, the above-mentioned radially inner side SL and an axially outer side So of the bead core 5, and a deviating part 11 from the base part 10. The deviating part 11 extends towards the carcass ply main portion 6a, while inclining towards the radially inside. The inclination angle theta thereof is, in order to prevent blowout phenomenon, set in a range of less than 90 degrees, preferably less than 75 degrees with respect to the above-mentioned radially outer side SU of the bead core 5.

Here, the deviating part 11 inclined as above is defined as a portion locating radially outward of an extension (a straight line in the cross sectional view) of the radially outer side SU. This part 11 may be straight. But, in this example, in order to increase the pull-out resistance, this part 11 is bent at a position near the above-mentioned extension. For the same reason, it can be curved into a circular arc or the like.

The distance La (shortest distance) of the end Pa of the deviating part 11 from the radially outer side SU is set in a range of from 5 to 12 mm, preferably 7 to 12 mm.

If the distance La is less than 5 mm, the springback of the deviating part 11 tends to increase. If the distance La is more than 12 mm, when the tire is largely deformed, a large stress is caused at the end Pa of the deviating part 11 and a separation failure is liable to occur staring from the end Pa.

Preferably, a gap Lb of from 1 to 5 mm is formed between the end Pa and the carcass ply main portion 6a.

If less than 1 mm, as the cord ends of the deviating part 11 are very liable to contact with the cords in the carcass ply main portion 6a, fretting wear is liable to occur. If more than 5 mm, it becomes difficult to secure the turnup portion 6b in the bead portion.

Between the carcass ply 6A and bead core 5, a rubber filler 12 is disposed.

The rubber filler 12 includes a main part 12A having a substantially triangular cross sectional shape filling a triangular space surrounded by the carcass ply main portion 6a, the turnup portion 6b (deviating part 11) and the radially outer side Su of the bead core, and optionally a film-like relatively thin part 12B between the base part 10 of the carcass ply turnup portion 6b and the above-mentioned sides Si, SL and So of the bead core 5.

The rubber filler 12 is made of a low-modulus rubber compound having a superior shock mitigate effect.

If the complex elastic modulus Ea* is more than 25 Mpa, stress at the end Pa can not be effectively mitigated. If less than 2 Mpa, when the carcass ply turnup portion 6b is pulled downwards by the tire inflation and the like, the turnup portion 6b becomes liable to move and it is difficult to obtain the necessary bead durability at very-high temperature. Therefore, the modulus Ea* is set in a range of not less than 2 Mpa, preferably more than 3 Mpa, more preferably more than 8 Mpa, still more preferably more than 13 Mpa, but not more than 25 Mpa.

For the rubber filler 12, a sulfur-rich rubber compound is preferably used in order to prevent the rubber from softening under very-high temperature conditions.

Although the content of sulfur as vulcanizing agent is usually in a range of from 1.0 to 4.5 phr, in this example, the sulfur content is set in a range of not less than 5.0 phr, preferably not less than 7.0 phr, but preferably not more than 12 phr, more preferably not more than 10 phr.

If the sulfur content is more than 12 phr, the rubber is liable to become an overcure condition and as a result, the adhesion to the adjacent tire components becomes insufficient.

The bead apex 8 is made of a radially inner apex 8A having a complex elastic modulus Eb1* of from 35 to 60 Mpa, and a radially outer apex 8B having a complex elastic modulus Eb2* less than the modulus Eb1*, but more than the complex elastic modulus Ea* of the rubber filler 12.

The boundary therebetween is inclined radially inwards, while extending axially outwardly from the carcass main portion to the turnup portion. In this example, in order to achieve ride comfort and steering stability, the radial height h01 of the radially inner apex 8A from the bead base line BL is set a range from 40 to 60% of the overall radial height h0 of the bead apex 8 from the bead base line BL.

Here, the complex elastic modulus is measured with a viscoelastic spectrometer under the following measuring conditions: temperature of 70 deg. C, frequency of 10 Hz and dynamic strain of plus/minus 2%.

The bead portions 4 are each provided with a bead reinforcing layer 15.

Figure 3:
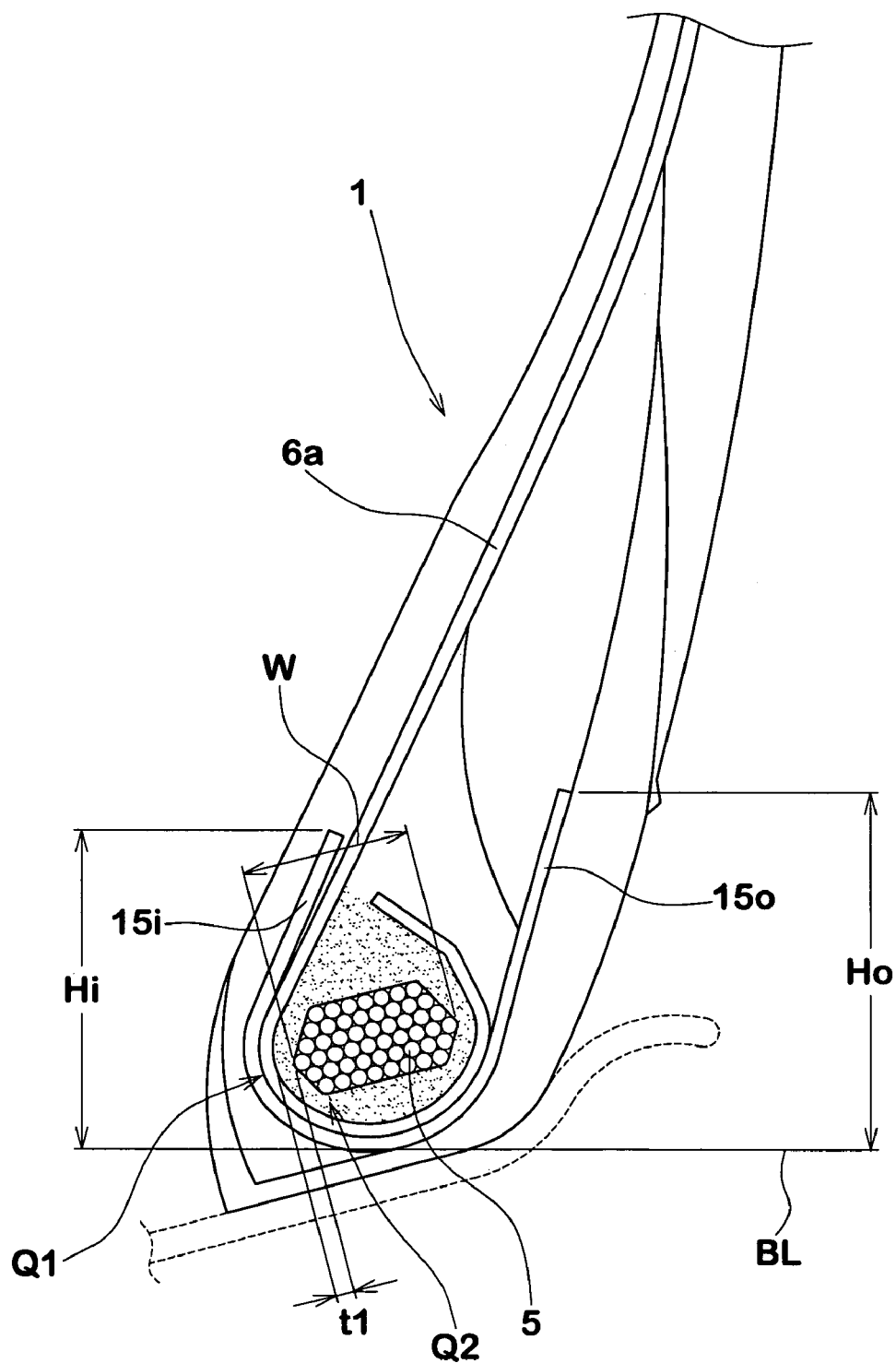
FIG. 3 is an enlarged cross sectional view of the bead portion showing a modification of the rubber filler 12.

The bead reinforcing layer 15 is made of a singe ply of steel cords laid at an angle of from 10 to 40 degrees with respect to the tire circumferential direction, and as shown in FIG. 3, it is composed of: a curved part 15A abutting the base part 10 of the carcass ply turnup portion 6b; an axially outer part 15o extending radially outwardly away from the base part 10, while slightly inclining axially outwards; and an axially inner part 15i extending along the carcass ply main portion 6a.

The axially outer part 15o extends along the axially outer surface of the bead apex 8, and terminates in the axially outer surface of the bead apex 8B in this example.

As to the axially inner part 15i, on the other hand, from a radial position near the radially outermost end of the bead core 5 to the end of this part 15i, the part 15i is slightly and gradually spaced apart from the carcass main portion, and the maximum space or rubber thickness at the end is under the carcass cord diameter under about 1 mm.

Thus, the bead portions 4 has a u-shaped cross sectional shape.

Figure 2A:
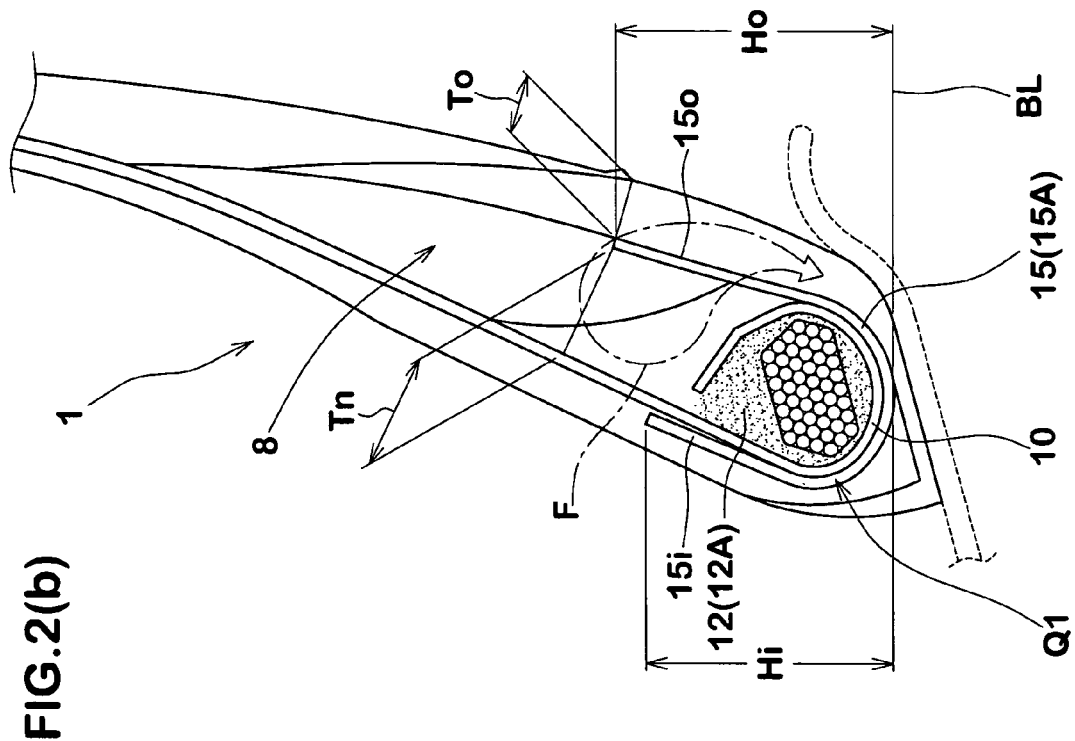
Figure 2B:
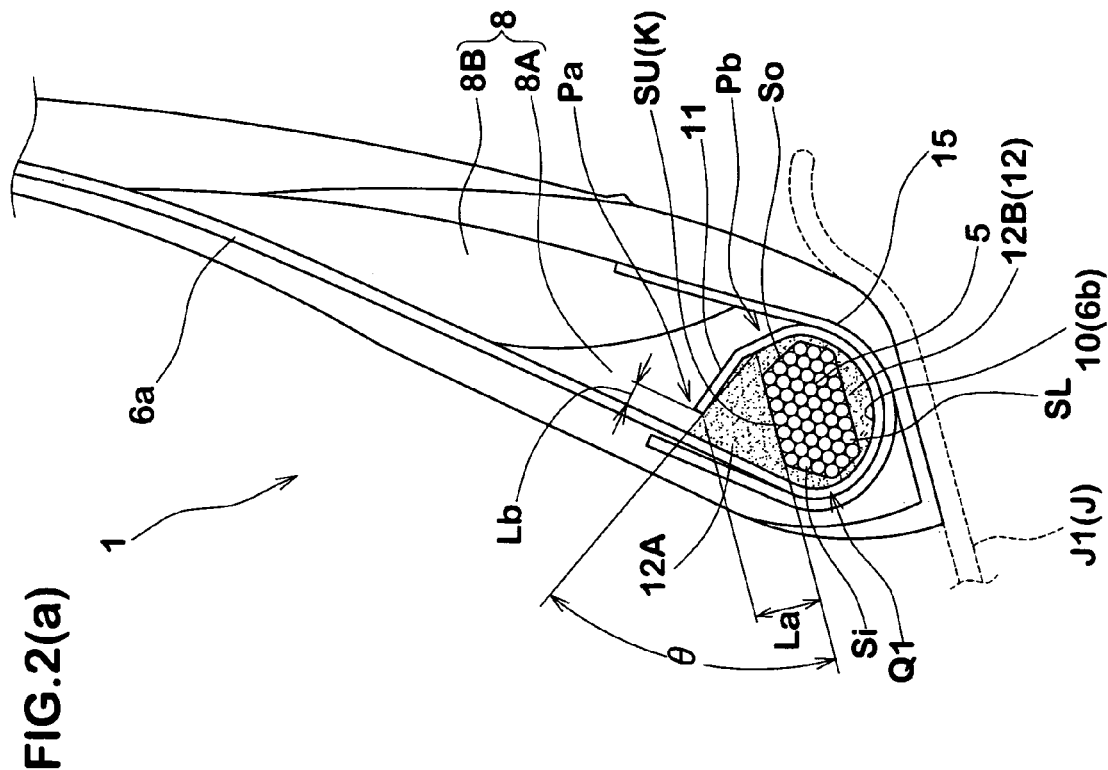

If the axially inner part 15i is not provided, when the tire is subjected to a heavy load, the lower sidewall portion is inclined largely along the curved portion of the rim flange. As a result, the rubber in the bead portion is moved radially inwards as shown in FIG. 2(b), and also the bead portion rotates around the bead core. Thus, heat generation from the rubber increases, and also a large share stress is caused between the carcass play main portion and the axially inside area (Q1) of the bead core. Under very-high temperature conditions in particular, as the hardness of the rubber decreases, the movement and rotation increases. The durability tends to deteriorate.

Contrary, by providing the bead reinforcing layer 15, when the tire is subjected to a heavy load, the reinforcing cords in the axially inner part 15i resist to the tensile stress and control the inclination of the sidewall. Thus the movement of the rubber and the rotation of the bead portion are prevented.

If the radial height Ho of the end of the axially outer part 15o is low, it becomes difficult to improve the durability under very-high temperature conditions. However, if the radial height Ho is more than 35 mm, as the stress concentrates on the end thereof, the durability under normal temperature conditions deteriorates. Thus, the radial height Ho is not more than 35 mm but preferably not less than 20 mm from the bead base line BL.

The distance To of the end of the axially outer part 15o from the axially outer surface of the bead portion 4 (namely, the sidewall rubber thickness To at the end) is set in the range of from 6 to 12 mm.

The ratio To/Ho of the distance To to the radial height Ho is set in the range from 0.25 to 0.5.

If the distance To is less than 6 mm and/or the ratio To/Ho is less than 0.25, the durability under normal temperature conditions.

The radial height Hi of the end of the axially inner part 15i is preferably set in the range of from 10 to 60 mm from the bead base line BL. If less than 10 mm, it is difficult to effectively reinforce the bead portion. If more than 60 mm, a stress concentration is liable to occur at the end of the axially inner part 15i, and as a result, the durability is liable to become insufficient even in a normal temperature range.

The distance Tn of the end of the axially outer part 15o from the carcass ply main portion 6a is set in the range of from 7 to 20 mm.

Increasing of the distance Tn is not so bad in view of the durability in the normal temperature range. But, if the distance Tn is excessively increased, as the heat accumulation during running is increased, very-high-temperature bead durability deteriorates. By limiting the distance Tn as above, sufficient durability may be obtained under both very-high and normal temperature conditions.

Further, at a result of inventors' analysis using a finite element method, it was discovered that the bead durability at a very-high temperature can be improved by setting the values of the radial heights Ho and Hi so as to satisfy a specific condition.

Figure 4:
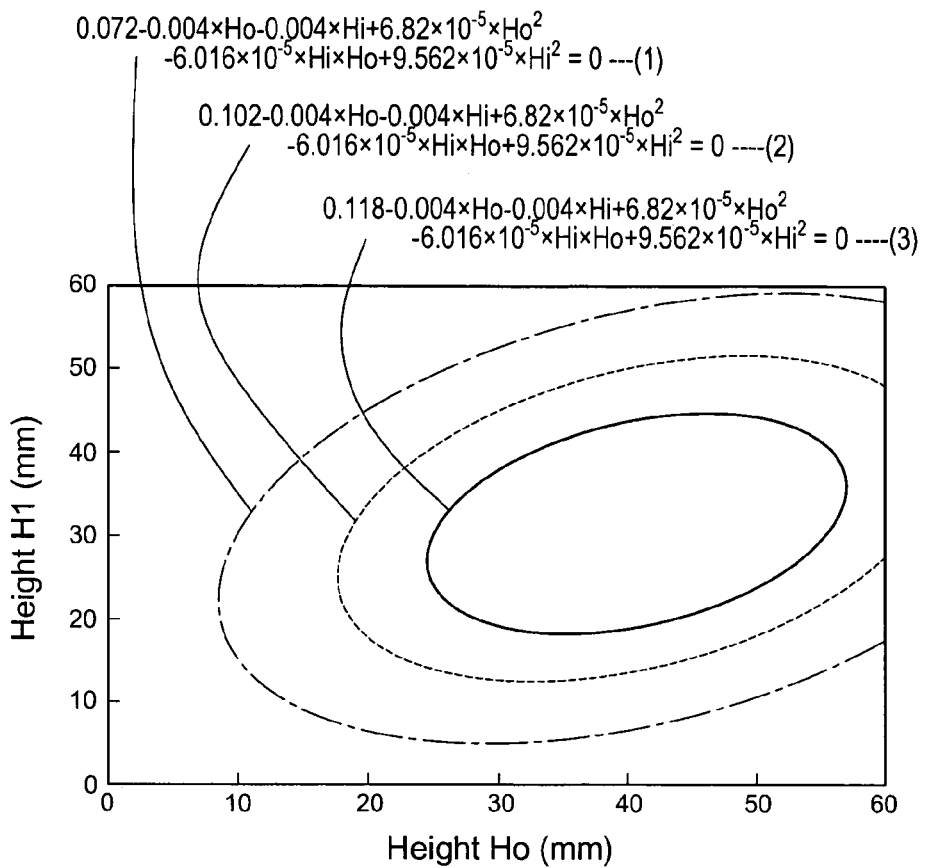
FIG. 4 is a chart for explaining the correlation of a strain δ at point Q1 with the radial heights Hi and Ho.

According to the analysis results, the share strain δ between the carcass ply 6A and bead core 5 at point Q1 has a correlation with the radial heights Hi and Ho. When the radial heights Hi and Ho are varied, it was found that in a specific elliptical area, the strain δ becomes smaller than the outside area, and the strain δ becomes decreased as approaching to the center of the elliptical area. Such elliptical area is shown in FIG. 4. The inside of the largest elliptical area is expressed by the following conditional expression (1). The inside of the middle elliptical area is expressed by the following conditional expression (2). The inside of the smallest elliptical area is expressed by the following conditional expression (3).

Thus, it is preferable that the radial height Ho and radial height Hi meet the following condition (1), more preferably condition (2), still more preferably condition (3):

$$0.072 - 0.004 \times Ho - 0.004 \times Hi + 6.82 \times 10^{-5} \times Ho^2 - \\ 6.016 \times 10^{-5} \times Hi \times Ho + 9.562 \times 10^{-5} \times Hi^2 \leq 0 \quad (1)$$

$$0.102 - 0.004 \times Ho - 0.004 \times Hi + 6.82 \times 10^{-5} \times Ho^2 - \\ 6.016 \times 10^{-5} \times Hi \times Ho + 9.562 \times 10^{-5} \times Hi^2 \leq 0 \quad (2)$$

$$0.118 - 0.004 \times Ho - 0.004 \times Hi + 6.82 \times 10^{-5} \times Ho^2 - \\ 6.016 \times 10^{-5} \times Hi \times Ho + 9.562 \times 10^{-5} \times Hi^2 \leq 0 \quad (3)$$

Although the bead durability at a very-high temperature can be improved thereby, in view of the bead durability under normal temperature and also prevention of failure at the ends of the axially outer part 15o and axially inner part 15i, it is proffered that the radial height Hi is not more than 60 mm, and the radial height Ho is not more than 60 mm more preferably not more than 35 mm.

Furthermore, it was discovered that, for the bead durability at a very-high temperature, it is preferable that the radial height Ho is limited in relation to the maximum tire section width point and that the rubber thickness t1 at the above-mentioned point Q1 is limited in a specific range.

Figure 5:
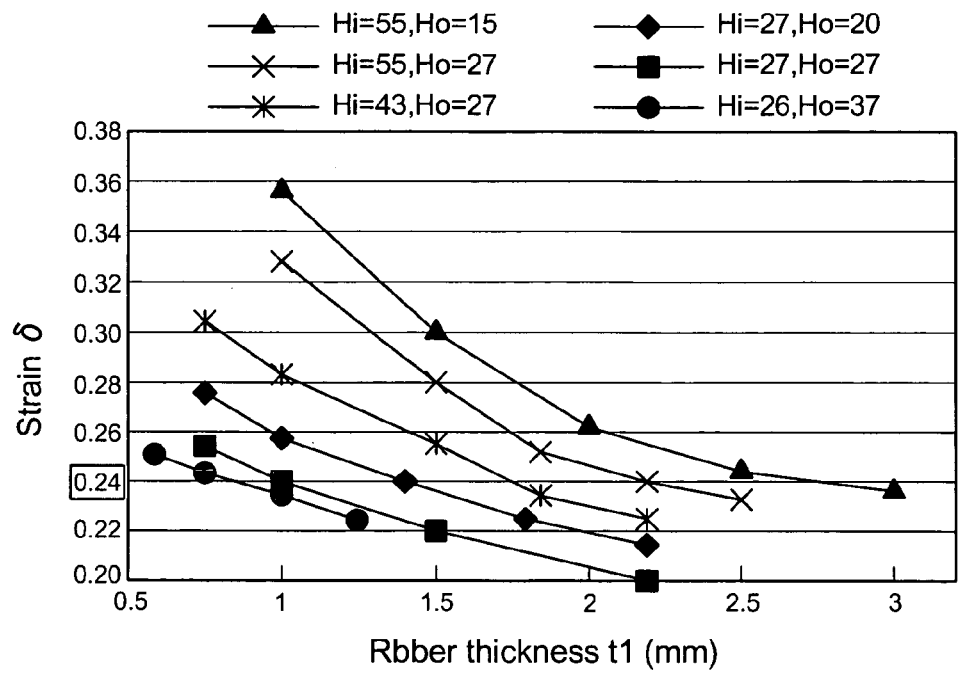
FIG. 5 is a graph showing the strain δ at point Q1 as a function of the rubber thickness t1 at point Q1.
Figure 8:
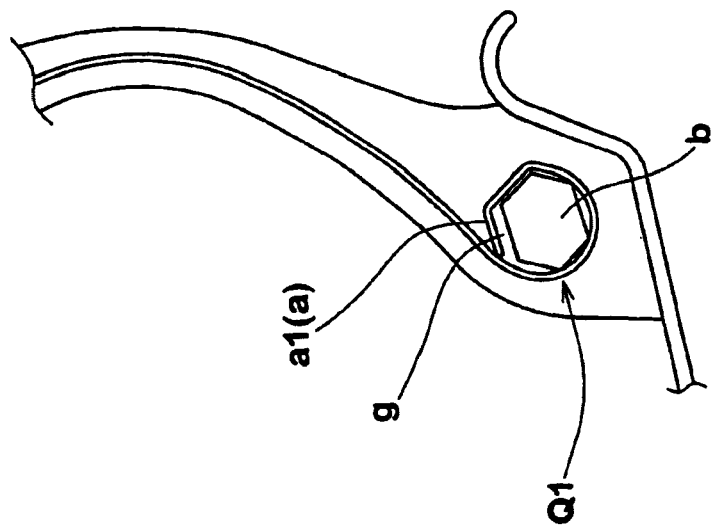
FIGS. 7 and 8 are cross sectional views showing prior art structures.
Figure 7:
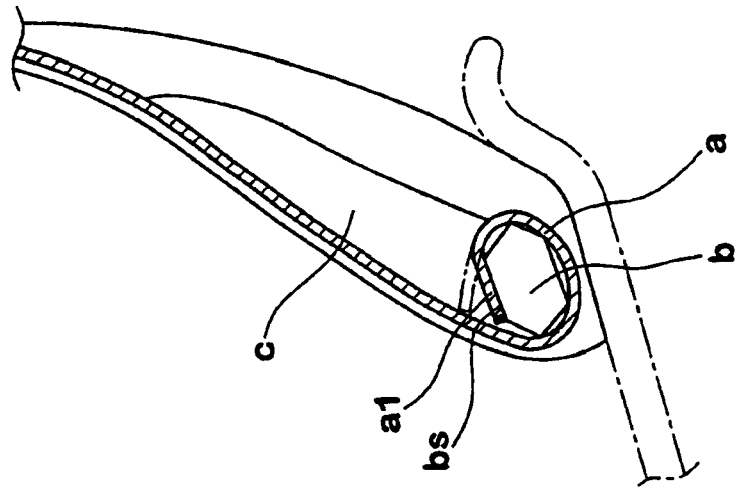

FIG. 5 shows the strain δ at the point Q1 as a function of the rubber thickness t1 at the point Q1 under various combinations of the radial heights Ho and Hi. This shows that the strain δ has a tendency to decrease as the rubber thickness t1 increases, and that when the strain δ is at most 0.24, a sufficient durability can be obtained.

Thus, at the axially innermost point Q1 of the bead core, the rubber thickness t1 between the bead wire and carcass cords is set in the range of from 0.8 to 2.8 mm.

Further, the radial height Ho of the axially outer part 15o from the bead base line BL is set in a range of from 13 to 33 % of the radial height Hm of the maximum section width point Pm of the carcass ply 6a (see FIG. 1) from the bead base line. If the rubber thickness t1 is less than 0.8 mm, it is difficult to control the strain δ. If the rubber thickness t1 is more than 2.8 mm, it becomes difficult to secure the carcass ply turnup portion 6b in the bead portion.

If the radial height Ho is less than 13 % of the height Hm, it is difficult to decrease the strain δ even when the rubber thickness t1 is decreased to the lower limit of 2.8 mm. If the radial height Ho is more than 33%, stress concentration on the end of the axially outer part 15o increases and the durability under normal temperature tends to decrease.

'Also it is preferable for the bead durability under very-high-temperature conditions that the rubber thickness t1 is limited to within a range of from 4.5 to 16.5% of the width w of the bead core 5 in the direction of its radially outer side SU. Further, it is preferable that the rubber thickness at the radially innermost point Q2 of the bead core 5 is set in a range of from 0.8 to 2.8 mm. The radial height Hi is in the range of from 10 to 60 mm.

From the test results, it was confirmed that the durability under both normal and high temperature conditions can be improved.

Under the high temperature condition, the bead damage was caused from a micro-separation between the cords and rubber occurred at the axially innermost point Q1 of the bead core.

TABLE 1

Figure 6:
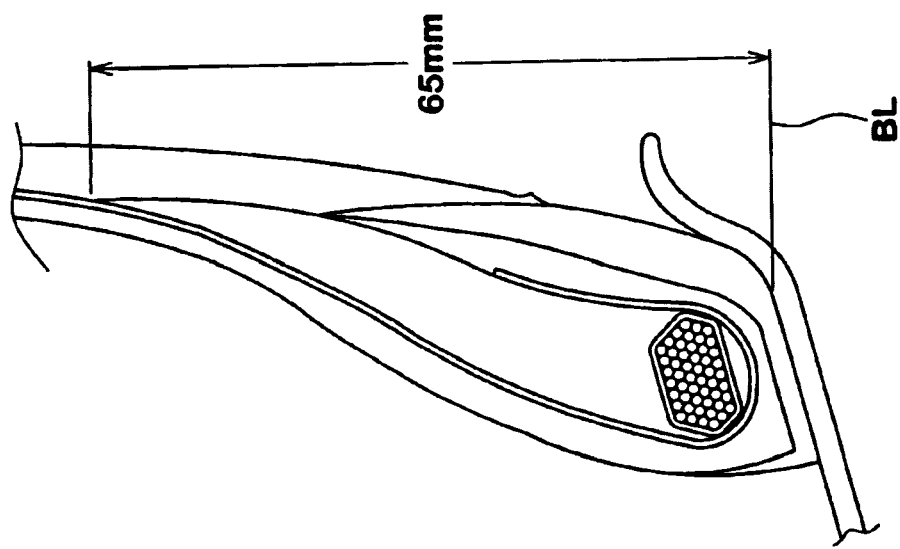
FIG. 6 is a cross sectional view of a bead portion used in the undermentioned comparison tests as a conventional structure.

| Tire | Ex. A1 | Ex. A2 | Ex. A3 | Conv. | Ref. A1 | Ref. A2 | Ref. A3 |
|---|---|---|---|---|---|---|---|
| Bead structure | FIG. 1 | FIG. 1 | FIG. 1 | FIG. 6 | FIG. 1 | FIG. 1 | FIG. 1 |
| La (mm) | 6 | 6 | 6 | — | 6 | 6 | 6 |
| Lb (mm) | 2 | 2 | 2 | — | 2 | 2 | 2 |
| Rubber filler | | | | — | | | |
| Modulus E* a (Mpa) | 9 | 9 | 9 | — | 9 | 9 | 9 |
| Bead reinforcing layer | | | | | | | |
| Hi (mm) | 25 | 25 | 25 | 25 | 25 | 25 | 25 |
| Ho (mm) | 28 | 35 | 15 | 27 | 50 | 15 | 28 |
| To (mm) | 9 | 9 | 9 | 6 | 9 | 9 | 5 |
| Tn (mm) | 14 | 14 | 14 | 14 | 14 | 14 | 14 |
| To/Ho | 0.32 | 0.26 | 0.4 | 0.22 | 0.2 | 0.6 | 0.18 |
| Bead durability | | | | | | | |
| Normal temperature | 120 | 110 | 125 | 100 | 95 | 120 | 95 |
| High temperature | 110 | 230 | 105 | 100 | 120 | 95 | 110 |

TABLE 2

| Tire | Ex. B1 | Ex. B2 | Ex. B3 | Ex. B4 | Conv. | Ref. B1 | Ex. B5 |
|---|---|---|---|---|---|---|---|
| Bead structure | FIG. 1 | FIG. 1 | FIG. 1 | FIG. 1 | FIG. 6 | FIG. 1 | FIG. 1 |
| La (mm) | 6 | 6 | 6 | 6 | — | 6 | 6 |
| Lb (mm) | 2 | 2 | 2 | 2 | — | 2 | 2 |
| Rubber filler | | | | | — | | |
| Modulus E* a (Mpa) | 9 | 9 | 9 | 9 | — | 9 | 9 |
| Bead reinforcing layer | | | | | | | |
| Hi (mm) | 27 | 27 | 38 | 27 | 55 | 55 | 52 |
| Ho (mm) | 27 | 30 | 38 | 37 | 27 | 15 | 42 |
| Meet condition (3)? | yes | yes | yes | yes | no | no | yes |
| Bead durability | | | | | | | |
| Normal temperature | 120 | 120 | 105 | 105 | 100 | 110 | 105 |
| High temperature | 110 | 115 | 120 | 110 | 100 | 90 | 105 |

Comparison Tests

Radial tires of size 11R22.5 (rim size 7.50×22.5) for tracks and buses having the same structure show in FIG. 1 except for the specifications shown in Tables were made and tested for the bead durability.

(I) Bead Durability Test Under Normal Temperature:

using a drum tester, the test tire mounted on a 7.50×22.5 standard wheel rim and inflated to a normal pressure was run under the following accelerated test conditions, and the total running time until any failure or bead damage was caused was measured. The results are indicated by an index based on conventional structure (conv.) being 100, wherein the large the index number, the better the durability.

Tire pressure: 700 kPa
Tire load: 27.25 kN×3 (300% of Max. load)
Running speed: 30 km/h.

(II) Bead Durability Test Under High Temperature:

The aforementioned test was made while heating the rim so as to maintain the temperature of 130 degrees C.

TABLE 3

| Tire | Ex. C1 | Ex. C2 | Ex. C3 | Conv | Ref. 1 | Ex. C4 |
|---|---|---|---|---|---|---|
| Bead structure | FIG. 1 | FIG. 1 | FIG. 1 | FIG. 6 | FIG. 1 | FIG. 1 |
| La (mm) | 6 | 6 | 6 | — | 6 | 6 |
| Lb (mm) | 2 | 2 | 2 | — | 2 | 2 |
| Rubber filler | | | | — | | |
| Modulus E* a (Mpa) | 9 | 9 | 9 | — | 9 | 9 |
| Bead reinforcing layer | | | | | | |
| Hi/Hm *1 | 0.24 | 0.24 | 0.48 | 0.48 | 0.38 | 0.32 |
| Ho/Hm *1 | 0.24 | 0.18 | 0.13 | 0.24 | 0.24 | 0.24 |
| t1 (mm) | 1.5 | 2.25 | 2.5 | 1.5 | 0.75 | 1 |

TABLE 3-continued

| Tire | Ex. C1 | Ex. C2 | Ex. C3 | Conv | Ref. 1 | Ex. C4 |
|---|---|---|---|---|---|---|
| Bead durability | | | | | | |
| Normal temperature | 120 | 125 | 130 | 100 | 110 | 110 |
| High temperature | 110 | 110 | 110 | 100 | 90 | 98 |

*1 Height Hm = 114 mm

What is claimed is:

1. A heavy duty tire comprising
a tread portion,
a pair of sidewall portions,
a pair of bead portions each with a bead core therein,
a carcass ply extending between the bead portions through the tread portion and sidewall portions, and turned up around the bead core in each said bead portion from the axially inside to the axially outside of the tire to form a pair of turnup portions and a main portion between the bead cores, and
a bead reinforcing layer disposed in each said bead portion, wherein
the turnup portion comprises a base part which curves along an axially inner side, a radially inner side and an axially outer side of the bead core, and a deviating part extending axially inwards away from the bead core,
said bead reinforcing layer comprises a curved part extending along the radially inside of the base part of the turnup portion, an axially outer part extending radially outwardly away from the base part, while slightly inclining axially outwards, and an axially inner part extending along the axially inside of the carcass ply main portion,
under a 50 kPa state of the tire in which the tire is mounted on a standard rim and inflated to 50 kPa;
said deviating part inclines towards the carcass ply main portion at an angle theta of less than 90 degrees with respect to the radially outer side of the bead core;
the distance La of the end of said deviating part from the radially outer side of the bead core is in a range of from 5 to 12 mm;
the radial height Ho of the axially outer part from the bead base line is in a range of from 20 to 35 mm;
the distance To of the end of the axially outer part from the axially outer surface of the bead portion is in a range of from 6 to 12 mm; and
the ratio To/Ho of the distance To to the height Ho is in a range of from 0.25 to 0.5.

2. A heavy duty tire according to claim 1, wherein the distance Lb between the end of the turnup portion and the carcass ply main portion is in a range of from 1 to 5 mm.

3. A heavy duty tire according to claim 1, wherein under the 50 kPa state, the distance Tn of the end of the axially outer part from the carcass ply main portion is in a range of from 7 to 20 mm.

4. A heavy duty tire according to claim 1, wherein under the 50 kPa state, the radial height Ho of the axially outer part and the radial height Hi of the axially inner part satisfy the following condition (1)

$$0.072 - 0.004 \times Ho - 0.004 \times Hi + 6.82 \times 10^{-5} \times Ho^2 - \\ 6.016 \times 10^{-5} \times Hi \times Ho + 9.562 \times 10^{-5} \times Hi^2 \leq 0 \quad (1)$$

5. A heavy duty tire according to claim 1 or 4, wherein under the 50 kPa state, the radial height Ho of the axially outer part is in a range of from 13 to 33% of the radial height Hm of the maximum section width point of the carcass ply, and
the rubber thickness t1 between the carcass cords a bead wire at the axially innermost point of the bead core is in a range of from 0.8 to 2.8 mm.

6. A heavy duty tire comprising
a tread portion,
a pair of sidewall portions,
a pair of bead portions each with a bead core therein,
a carcass ply extending between the bead portions through the tread portion and sidewall portions, and turned up around the bead core in each said bead portion from the axially inside to the axially outside of the tire to form a pair of turnup portions and a main portion between the bead cores, and
a bead reinforcing layer disposed in each said bead portion, wherein
the turnup portion comprises a base part which curves, along an axially inner side, a radially inner side and an axially outer side of the bead core, and a deviating part extending axially inwards away from the bead core,
said bead reinforcing layer comprises a curved part extending along the radially inside of the base part of the turnup portion, an axially outer part extending radially outwardly away from the base part, while slightly inclining axially outwards, and an axially inner part extending along the axially inside of the carcass ply main portion,
under a 50 kPa state of the tire in which the tire is mounted on a standard rim and inflated to 50 kPa:
said deviating part inclines towards the carcass ply main portion at an angle theta of less than 90 degrees with respect to the radially outer side of the bead core;
the distance La of the end of said deviating part from the radially outer side of the bead core is in a range of from 5 to 12 mm; and
the radial height Ho of the axially outer part from the bead base line and the radial height Hi of the axially inner part from the bead base line satisfy the following condition (1)

$$0.072 - 0.004 \times Ho - 0.004 \times Hi + 6.82 \times 10^{-5} \times Ho^2 - \\ 6.016 \times 10^{-5} \times Hi \times Ho + 9.562 \times 10^{-5} \times Hi^2 \leq 0 \quad (1)$$

7. A heavy duty tire according to claim 6, wherein the distance Lb between the end of the turnup portion and the carcass ply main portion is in a range of from 1 to 5 mm.

8. A heavy duty tire comprising
a tread portion,
a pair of sidewall portions,
a pair of bead portions each with a bead core therein,
a carcass ply extending between the bead portions through the tread portion and sidewall portions, and turned up around the bead core in each said bead portion from the axially inside to the axially outside of the tire to form a pair of turnup portions and a main portion between the bead cores, and a bead reinforcing layer disposed in each said bead portion, wherein the turnup portion comprises a base part which curves along an axially inner side, a radially inner side and an axially outer side of the bead core, and a deviating part extending axially inwards away from the bead core, said bead reinforcing layer comprises a curved part extending along the radially inside of the base part of the turnup portion, an axially outer part extending radially outwardly away from the base part, while slightly inclining axially outwards, and an axially inner part extending along the axially inside of the carcass ply main portion, under a 50 kPa state of the tire in which the tire is mounted on a standard rim and inflated to 50 kPa:

said deviating part inclines towards the carcass ply main portion at an angle theta of less than 90 degrees with respect to the radially outer side of the bead core;

the distance La of the end of said deviating part from the radially outer side of the bead core is in a range of from 5 to 12 mm;

the radial height Ho of the axially outer part from the bead base line is in a range of from 13 to 33% of the radial height Hm of the maximum section width point of the carcass ply main portion 6a from the bead base line; and the rubber thickness t1 between the carcass cords and the bead wire at the axially innermost point of the bead core is in a range of from 0.8 to 2.8 mm.

9. A heavy duty tire according to claim 1, wherein the distance Lb between the end of the turnup portion and the carcass ply main portion is in a range of from 1 to 5 mm.

* * * * *